(12) United States Patent
Sanz et al.

(10) Patent No.: US 9,452,400 B2
(45) Date of Patent: Sep. 27, 2016

(54) SYSTEM FOR DENSE LOADING OF CATALYST INTO BAYONET TUBES FOR A STEAM REFORMING EXCHANGER-REACTOR USING REMOVABLE DEFLECTORS

(71) Applicant: IFP ENERGIES NOUVELLES, Rueil-Malmaison (FR)

(72) Inventors: Elena Sanz, Lyons (FR); Robert Beaumont, Rillieux la Pape (FR); Christophe Boyer, Charly (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/436,146

(22) PCT Filed: Sep. 24, 2013

(86) PCT No.: PCT/FR2013/052239
§ 371 (c)(1),
(2) Date: Apr. 16, 2015

(87) PCT Pub. No.: WO2014/060668
PCT Pub. Date: Apr. 24, 2014

(65) Prior Publication Data
US 2015/0283528 A1    Oct. 8, 2015

(30) Foreign Application Priority Data

Oct. 17, 2012 (FR) ...................................... 12/02769

(51) Int. Cl.
B65B 39/00 (2006.01)
B01J 8/00 (2006.01)
B01J 8/06 (2006.01)

(52) U.S. Cl.
CPC ................ *B01J 8/003* (2013.01); *B01J 8/002* (2013.01); *B01J 8/06* (2013.01); *B01J 2208/00752* (2013.01); *B01J 2208/00778* (2013.01)

(58) Field of Classification Search
CPC . B01J 8/002; B01J 8/003; B01J 2208/00778
USPC ...................... 141/364, 365; 414/287; 193/32
See application file for complete search history.

(56) References Cited

U.S. PATENT DOCUMENTS 3,854,637 A * 12/1974 Muller, Jr. ......... B65G 69/0441
                                                       222/564
8,025,472 B2   9/2011 Fry
(Continued)

FOREIGN PATENT DOCUMENTS

| EP | 1749568 A1 | 2/2007 |
|---|---|---|
| FR | 2789050 A1 | 8/2000 |
| FR | 2950822 A1 | 4/2011 |
| WO | 2007/039764 A1 | 4/2007 |
| WO | 2008/151139 A1 | 12/2008 |

OTHER PUBLICATIONS

International Search Report dated Jan. 21, 2014 issued in corresponding PCT/FR2013/052239 application (pp. 1-3).
(Continued)

*Primary Examiner* — Jason K Niesz
(74) *Attorney, Agent, or Firm* — Millen, White, Zelano and Branigan, P.C.

(57) ABSTRACT

The present invention describes a device and a method for dense and homogeneous loading of catalyst into the annular space of bayonet tubes employed in a steam reforming reactor, said device being constituted by a series of removable deflectors.

6 Claims, 2 Drawing Sheets

(56) References Cited

U.S. PATENT DOCUMENTS

| | | |
|---|---|---|
| 8,578,978 B2 | 11/2013 | Sanz et al. |
| 2008/0298932 A1 | 12/2008 | Fry |
| 2009/0090429 A1 | 4/2009 | Cochrane et al. |
| 2009/0257849 A1 | 10/2009 | Oliveira et al. |
| 2011/0083769 A1 | 4/2011 | Sanz et al. |
| 2011/0150624 A1 | 6/2011 | Fry |

OTHER PUBLICATIONS

English Translation Abstract of FR 2789050 A1 published Aug. 4, 2000.

English Translation Abstract of EP 1749568 A1 published Feb. 7, 2007.

* cited by examiner

SYSTEM FOR DENSE LOADING OF CATALYST INTO BAYONET TUBES FOR A STEAM REFORMING EXCHANGER-REACTOR USING REMOVABLE DEFLECTORS

FIELD OF THE INVENTION

The present invention relates to the field of loading catalytic tubes used in tubular reactors employing highly endothermic or highly exothermic reactions. Thus, the present invention is particularly suitable for a reactor for steam reforming natural gas or various hydrocarbon cuts with a view to producing the $CO+H_2$ mixture known as synthesis gas.

Two major families of steam reforming reactors can be distinguished: reactors in which the heat is supplied by a series of burners located inside the reactor, and those in which the heat is supplied via a heat transfer fluid, generally combustion fumes, said combustion taking place outside the steam reforming reactor per se.

Certain reactors of this latter type, which will hereinafter be denoted exchanger-reactors, employ simple tubes. Others use double-walled concentric tubes which are also known as bayonet tubes. A bayonet tube can be defined as an inner tube surrounded by an outer tube which is coaxial with the inner tube, the annular space between the inner tube and the outer tube generally being filled with catalyst. In the remainder of the text, the term "annular space" or "catalytic zone" will be used to designate said annular space defined by the bayonet tubes.

In the context of the present invention, natural gas, or more generally the hydrocarbon feed, is introduced via the annular zone in a top to bottom flow and the reaction effluents are collected in the central portion of the internal tube in a bottom to top flow. A reversed direction of flow of the feed and reaction effluents is also possible.

The reaction for steam reforming natural gas for the production of hydrogen is highly endothermic and thus generally takes place in furnaces or in exchanger-reactors as defined above. The reaction takes place at very high temperatures, typically 900° C., and under pressures which are typically 20 to 30 bars. Under these conditions, due to the mechanical behaviour of the materials, the reaction can only be carried out under viable economic conditions if it is inside tubes.

Catalytic exchanger-reactors are thus constituted by a multitude of tubes, typically of the order of 200 to 350 tubes for units producing 100000 $Nm^3/h$ of hydrogen, this series of tubes being enclosed in a shell which receives the hot fluid, which means that the heat necessary for the steam reforming reaction can be supplied.

This hot fluid or heat transfer fluid is generally constituted by the fumes from a combustion which has taken place outside the exchanger-reactor.

Thus, the catalyst has to be installed in all of the steam reforming tubes in a regular manner from one tube to another, in order to have an identical pressure drop from one tube to another.

This condition is very important in guaranteeing a good distribution of reagents over the series of catalytic tubes and to prevent one tube from being undersupplied, for example, which could result in major overheating of the material constituting the tube, this overheating substantially reducing the service life of the tube.

Similarly, it is important that no voids, i.e. areas without catalyst or depleted in catalyst, subsist in a tube as again, the tube could overheat locally in the absence of a catalytic reaction inside it. In addition, any heterogeneity in the distribution of the catalyst in the reaction zone could result in an unbalanced flow of reaction fluid or fluids.

Thus, the aim of the device of the invention is to allow loading which is both dense and homogeneous over each of the bayonet tubes forming part of the exchanger-reactor.

EXAMINATION OF THE PRIOR ART

In a conventional reforming furnace, the tubes, which typically have an internal diameter of 10 cm, are conventionally loaded using bags filled with catalyst which are opened over the surface of the bed. This mode of loading is known to the skilled person as "sock loading" and is known not to result in a high loading density.

The tubes are then manually vibrated by being struck with a hammer or a mechanical vibration system, to encourage the grains of catalyst to become properly positioned and minimize the voids and thus increase the loading density. However, excessive vibration might result in rupture of the catalyst grains and a substantial increase in the pressure drop.

However, with this method it is difficult to produce good quality loading and it is generally necessary to repeat the vibration operation several times in order to obtain pressure drops which are similar from one tube to another.

Other improved procedures and equipment have been proposed under the technological term Unidense™ initially developed by Norsk Hydro, or under the technological term Spiraload™ developed by Haldor Topsøe. These technologies are applicable to single tubes, but not to bayonet tubes.

The Applicant's patent FR 2 950 822 describes a solution for loading bayonet tubes with 3 loading tubes, with mechanical brakes or pneumatic braking. That loading method can be used to produce dense, uniform loading of the bayonet tubes. It is a "grain by grain" method and turns out to be too slow and poorly suited for use on the scale of an industrial reactor comprising several hundred tubes.

In general, it could be said that many documents exist in the field of loading catalyst into steam reforming tubes. The majority of them use flexible slowing means or rigid obstacles in the form of an inclined plane.

However, none of the documents found concerns an application to bayonet tubes when an annular zone is loaded, avoiding the central tube.

The device of the present invention can thus be defined as a device for dense loading of catalyst into the annular zone of bayonet tubes provided in a steam reforming exchanger-reactor, the device being used to obtain a homogeneous loading density in each of the tubes of the exchanger-reactor within a time period which is compatible with the demands of industrial scale start-up.

In addition, in a certain number of cases, the device of the invention must be able to be adapted to a variation in the diameter of the external tube, imposed by mechanical and thermal stresses which change along the tube, and thus to a change in the dimensions of the annular zone.

BRIEF DESCRIPTION OF THE FIGURES

FIG. 1(A) is a side view; FIG. 1(B) is a top view and FIG. 1(c) can be used to understand the significance of the angles α and β. FIG. 1(D) shows rubber lips n deflector (7).

Figure 1:
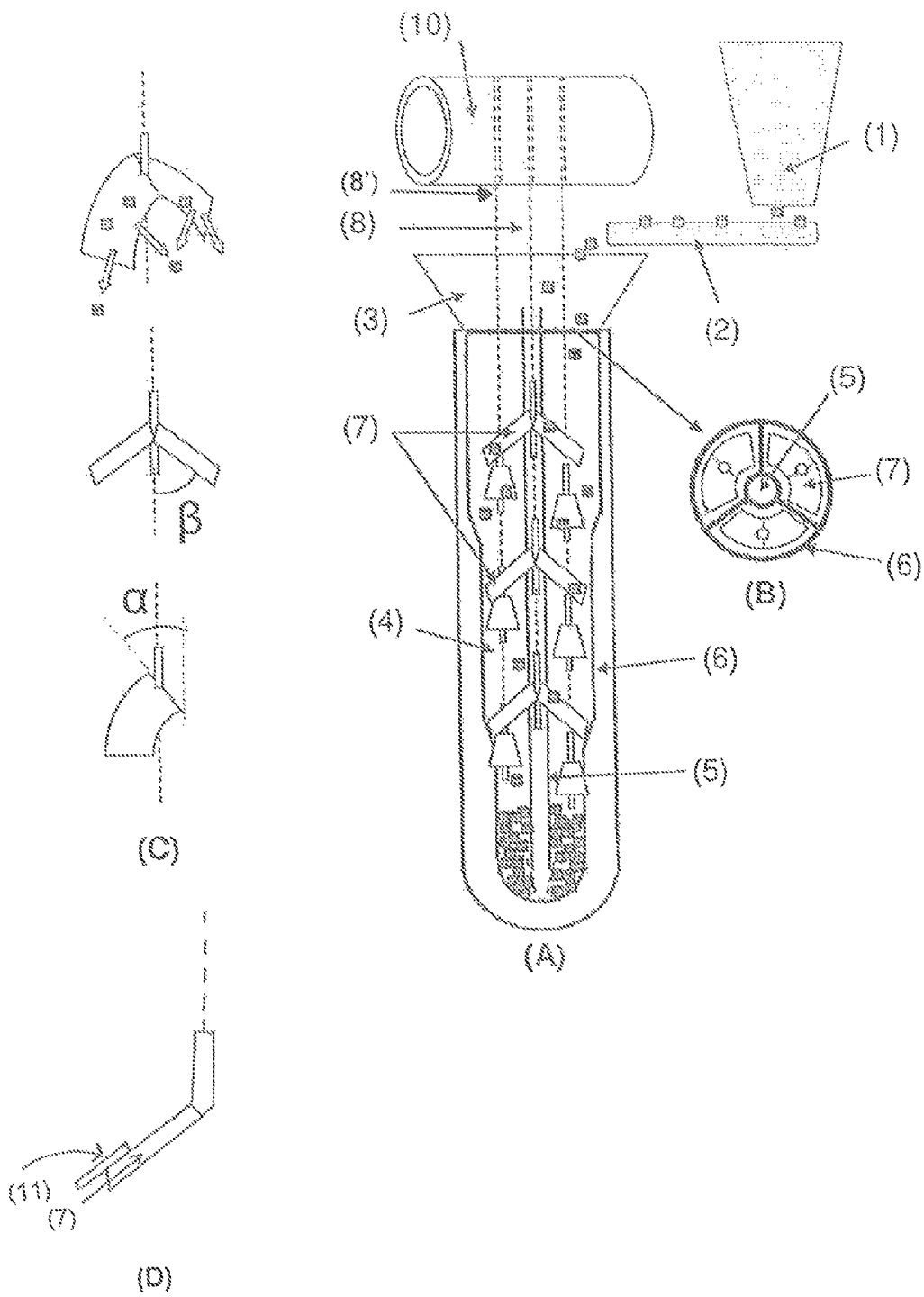
FIG. 1 represents a device in accordance with the invention in the case in which the annular zone of each bayonet tube is divided into 3 loading sectors with identical surface areas formed by the system for holding the central tube in the upper portion of the catalytic tube. The device comprises a feed hopper 1 which is common to the 3 sectors, a conveyor belt 2 which is common to the 3 sectors, a funnel 3 which is specific to each sector or common to the three sectors, deflectors 7 connected via chains 8 to a spooler 10, this being for each of the sectors. A top view of the device indicates the degree of occupation of the horizontal section of a sector by the deflector.

Because the internal tube 5 traverses the external tube 6, a device has to be put in position which is identical to that which would be used in the case of an annular zone divided into two sectors of identical section.

FIG. 2(A) is a side view; FIG. 2(B) is a top view and FIG. 2(C) can be used to visualize the angle α.

BRIEF DESCRIPTION OF THE INVENTION

The present invention can be defined as a device for densely filling catalyst specially adapted to a steam reforming exchanger-reactor consisting of a plurality of bayonet tubes enclosed in a shell, each bayonet tube comprising an annular zone which is at least partially filled with catalyst. Said catalyst is constituted by particles occupying at least part of the annular space 4 included between an internal tube 5 and an external tube 6, the assembly of these two tubes constituting the bayonet tube, the width of said annular space being in the range 30 mm to 80 mm, and its height being in the range 10 to 20 meters.

The catalyst particles are generally in the form of cylinders with an approximate height of 10 mm to 20 mm and an approximate diameter of 5 mm to 20 mm.

In its basic version, the device of the present invention consists of:
  a series of deflectors 7 distributed in a regular vertical manner along the annular space 4 and separated by a vertical distance in the range 50 cm to 150 cm;
  said deflectors 7 being connected together via a chain 8 which winds around a spooler 10 located outside the tube to be filled, and the particles of catalyst being contained in:
    a central feed hopper 1 for delivering the particles onto a conveyor belt or a shaker conveyor 2 supplying each sector, via:
    a funnel 3 via which the particles flow into the interior of the annular space 4.

In its basic version, the annular space 4 of each bayonet is not divided up and the filling device of the present invention occupies a portion of this annular space which is in the range 50% to 90%.

In other variations linked to the existence of a centralizing element for the internal tube with respect to the external tube, or linked to the internal tube 5 passing through the external tube, the annular zone 4 of each bayonet tube is divided into a certain number of sectors with areas which are substantially identical extending over the entire length of the tube. In general, the number of sectors will be two or three, each sector then being equipped with a system of deflectors as described in the basic version. These systems of deflectors, one per sector, then form the device of the invention.

In a particular, particularly frequent case in the field of application of the present device, the upper portion of the annular space 4 is traversed by the internal tube 5 the outlet end of which is located outside the external tube 6.

This passage of the internal tube 5 constitutes an obstacle and results in using two deflector systems in parallel as if the annular space were divided into two sectors.

In general, each deflector is substantially in the form of a vane which is downwardly inclined at an angle alpha α with respect to the vertical in the range 30° to 50°, each deflector occupying a portion of the horizontal surface area of the sector in the range 50% to 90% of said surface area of the sector.

In certain cases, a bend in the vane along a radial ridge is introduced so that this ridge is located in the axis of a radius. The bend is characterized by the angle beta β with the vertical formed by each half-vane which is so constituted. The angle β can take values in the range 20° to 75°, preferably in the range 30° to 60°.

In the case in which the diameter of the wall of the annular space 4 varies because portions of the external tube 6 have diameters which decrease from top to bottom, the system of deflectors 7 adapts itself to this variation in section, always satisfying the condition of occupation of said horizontal section in the range of 50% to 90% by adjusting the angle alpha, the smallest value being adapted to the portion with the smallest diameter and the largest value to the portion with the largest diameter, the articulation of the blade of the deflector about its axis being free, and a second set of chains allowing the end of the blade of the deflector to be lifted to a greater or lesser extent in order to vary the angle alpha.

Again in the case in which the diameter of the wall of the annular space 4 varies because portions of the external tube 6 have diameters which decrease from top to bottom, the system of deflectors 7 may be provided, at its ends closest to the wall of the annular space 4, with lips formed from flexible rubber which can be used to adjust the length of the blades by being bent to a greater or lesser extent in order to conserve the coefficient of occupation of the section of the annular space. A mass is then added to the bottom of the chain to force the system to descend into the portion with the smallest diameter of the annular zone 4.

The present invention also concerns a method for loading a catalyst using the device described above, which method can be broken down into the following series of steps:
  the loading system is initially wound into the external spooler 10, the feed hopper 1 being filled with solid;
  the loading system is then gradually introduced into the annular zone 4 via its upper portion until the first deflector 7 reaches a distance with respect to the bottom of the tube in the range 50 cm to 100 cm;
  the conveyor belt 2 is started up so as to provide a flow rate of solid in the range 250 to 500 kg/h, which solid is introduced into the annular zone 4 or a sector of said annular zone 4 via the funnel 3;
  as and when the tube is filled, the loading system is raised from the annular zone 4 with the aid of the external spooler 10 in a manner such as to keep a constant distance between the first deflector 7 and the surface of the bed which is gradually being constituted, said distance being in the range 50 cm to 100 cm;
  the system is wound up at a speed equivalent to the speed of loading of the tube, in the range 0.2 m/min to 0.4 m/min;
  once the tube has been loaded and the loading system wound up, the system is displaced in order to load the next tube.

DETAILED DESCRIPTION OF THE INVENTION

The present invention can be defined as a device for the dense loading of catalyst into the annular space of bayonet tubes, each bayonet tube having a height in the range 10 to 20 m, a diameter of the external tube 6 in the range 250 mm to 150 mm, and an external diameter of the internal tube 5 in the range 10 to 40 mm.

The annular space containing the catalyst thus has a characteristic width of approximately 50 mm. In practice, depending on the case, the characteristic width of the annular space can vary between 30 and 80 mm.

In addition, in some cases, the external tube 6 has a diameter which decreases from top to bottom in sections, which therefore means that the characteristic width of the annular space also reduces going from top to bottom. The device of the invention must therefore adapt itself to these variations in characteristic width and retain its performance over the whole series of sections.

The grains of catalyst are in the form of cylinders approximately 1 cm to 2 cm in height and 0.5 cm to 2 cm in diameter. One of the problems posed by them being loaded into tubes more than 15 meters in length is the risk of these cylinders breaking if they are allowed to simply fall freely without taking any precautions; this is one of the solutions for producing a dense loading.

Other problems are linked to the geometry per se of the catalytic space, which is annular, which prohibits the passage of conventional loading systems.

In addition, the internal tube 5 of the bayonet is generally kept coaxial with the external tube 6 via at least one centralizing part which divides the annular space into several sectors; this prohibits the use of any device which would surround the central tube.

In certain cases, the internal tube 5 which traverses the external tube 6 has to be accommodated in order to allow the reaction effluents to leave in a completely unobstructed manner.

As indicated in the prior art, the risk of arching over is accentuated when the ratio between the diameter of the tube and the principal dimension of the particles is less than 8, which is often the case in the context of the present invention, since the typical width of the annular space (50 mm) equates to about 4 times the characteristic diameter of the particles of catalyst.

Finally, loading is carried out tube by tube (or in groups of two or three tubes supplied in parallel), and so it has to be sufficiently rapid for industrial use, because a steam reforming reactor aimed at a production of approximately 100000 Nm$^3$/h of H$_2$ generally includes approximately 200 to 350 bayonet tubes.

This set of constraints is satisfied by the dense filling device of the present invention which can be defined as follows:

The present invention describes a device for dense filling of catalyst into a steam reforming reactor consisting of a plurality of bayonet tubes enclosed in a shell, the catalyst being constituted by solid grains occupying at least a portion of the annular space included between an internal tube and an external tube, the assembly of these two tubes constituting a bayonet tube. The steam reforming exchanger-reactor to which the present invention applies is constituted by approximately 300 identical bayonet tubes with a height in the range 12 to 20 meters, the series of these bayonet tubes being enclosed in a shell which may reach 10 meters in diameter.

The width of the annular space included between the internal tube and the external tube of a bayonet tube is in the range 30 mm to 80 mm, and its height is in the range 12 to 20 meters. The particles of catalyst are generally in the form of cylinders with a height of approximately 5 to 20 mm and a diameter of approximately 10 to 20 mm.

The annular space defined in this manner may be unitary or divided into several substantially identical sectors using a system known as a "centralizer". Thus, a sector is defined as a portion of the annular space which corresponds to a clearly defined fraction of the annular section and extends over the whole height of said annular space.

The filling device of the invention consists of:
- a series of deflectors 7 vertically distributed in a regular manner and separated by a vertical distance in the range 50 cm to 150 cm, each deflector 7 occupying a portion of the annular section in the range 50% to 90%;
- said deflectors 7 being connected together via a chain 8 which is wound around a spooler 10 located outside the tube to be filled, and the particles of catalyst being contained in:
  - a central feed hopper 1 for delivering the particles onto a conveyor belt or a shaker conveyor 2 supplying the annular space 4 (or each sector of said annular space when it is divided into sectors) by means of:
  - a funnel 3 via which the particles flow into the interior of the annular space 4.

The means 2 for transporting particles from the central feed hopper 1 to the funnel 3 may be any means for transporting solid particles which is known to the skilled person.

In accordance with a first variation of the filling device of the present invention, the annular space is divided into two or three substantially identical sectors, which sectors extend over the entire length of the bayonet tube by means of a system known as a "centralizer" disposed at the head of the annular space, each sector being equipped with an independent system of deflectors as described above. This amounts to saying that the device is thus constituted by two or three identical systems operating in parallel, each system of deflectors occupying a sector of the annular space. In this case and preferably, the funnel 3 is specific to each of the sectors, while the conveyor belt 2 and the feed hopper 1 are common to the three sectors.

In a second variation of the filling device of the present invention, the upper portion of the annular space 4 is traversed by the internal tube 5 which constitutes an obstacle and results in the use of two independent deflector systems as if the annular space were divided into two sectors.

Each deflector 7 typically has the form of a vane inclined downwardly at an angle alpha with respect to the vertical which is in the range 30° to 50°, each deflector occupying a portion of the horizontal surface area of the sector in the range 50% to 90% of said surface area of the sector.

In certain cases, a bend in the vane along a radial ridge is introduced so that this ridge is located in the axis of a radius. The bend is characterized by the angle beta α which each half-vane so constituted forms with the vertical. The angle β can take values in the range 20° to 75°, preferably in the range 30° to 60°.

In a variation of the filling device of the present invention, the diameter of the wall of the annular space varies, defining tube portions with diameters which decrease from top to bottom. In this case, the deflector adapts itself to this variation in section, always satisfying the condition of occupation of said horizontal section in the range of 50% to 90% by adjusting the angle alpha, the smallest value of the angle alpha being adapted to the portion with the smallest diameter and the largest value of the angle alpha to the portion with the largest diameter. The articulation of the blade of the deflector about its axis must be free, and so a second set of chains allows the end of the blade of the deflector to be lifted to a greater or lesser extent in order to vary the angle alpha.

In another solution for accommodating a variable diameter of the annular space, deflectors are used, with their ends closest to the wall of the annular space being provided with lips formed from rubber which can be used to adjust the length of the blades in order to conserve the coefficient of occupation of the section of the annular space 4.

In order to assist the drop of the series of deflectors, and because the friction of the rubber extensions at the wall of the annular space 4 could render this drop fairly difficult, it is possible to provide the deflectors 7 with weights suspended on said deflector.

The deflectors may have any shape, provided that the projected surface area of that shape in a horizontal plane satisfies the percentage occupation of the horizontal section of the annular zone or sector when said annular zone is divided into several sectors.

In general, a deflector has the shape of a blade inclined downwardly at an angle alpha with respect to the vertical in the range 30° to 50°.

An example which may also be cited is an extension formed from flexible rubber at the rim of the deflector located closest to the internal wall of the annular space 4, which means that it remains in contact with said wall despite the latter's variation in diameter.

In the case in which the annular space is divided into 3 identical vertical sectors, the preferred shape of the deflector is that of a vane which matches the shape of the annular sector in a substantially parallel manner while satisfying the condition of occupation of the surface area of the horizontal section within the limits of 50% to 90%.

Figure 2:
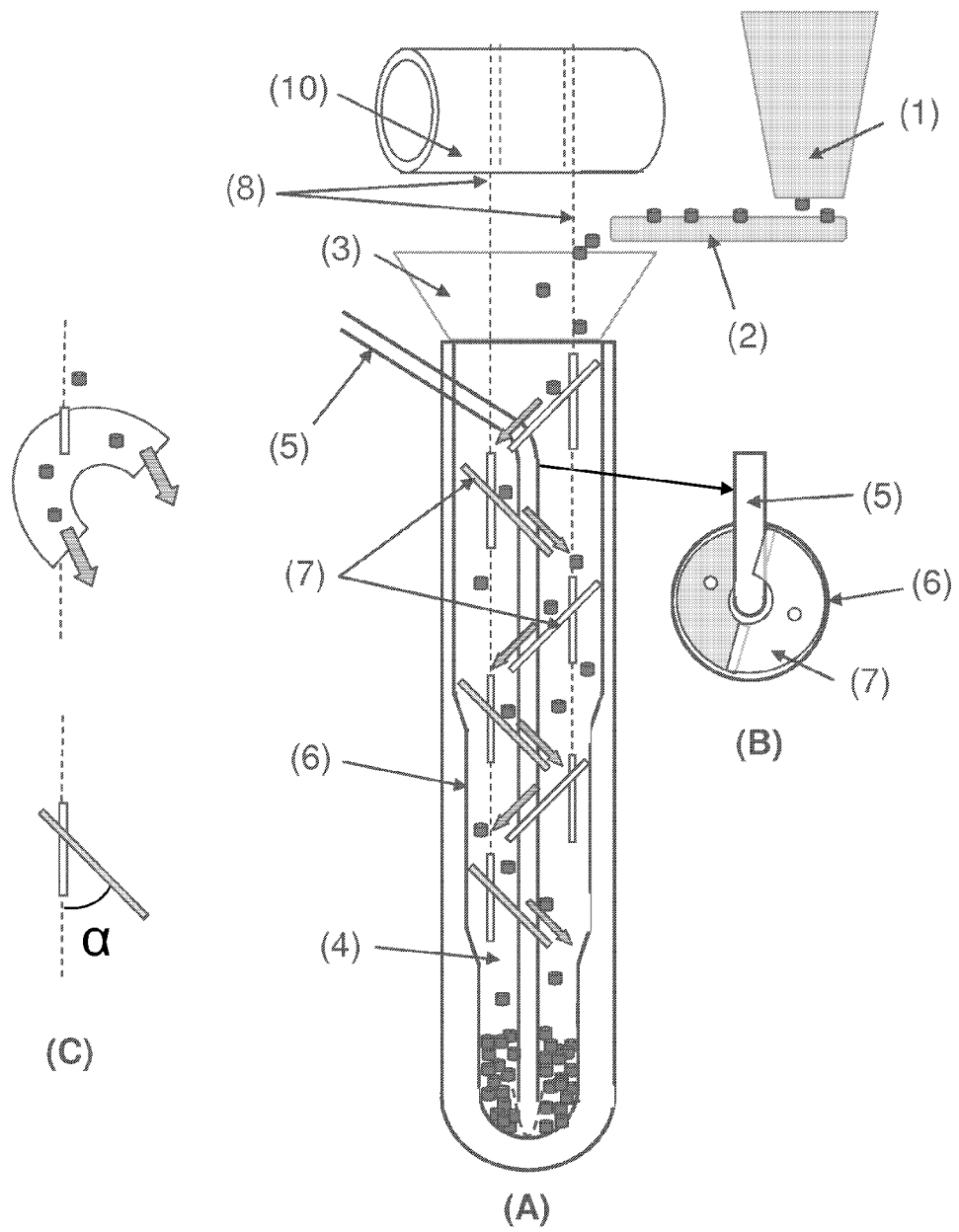
FIG. 2 represents a device in accordance with the present invention in the case in which the internal tube 5 laterally traverses the external tube 6, thereby creating a bend in the upper portion which reduces the cross section of flow for introducing the loading system.

In the case of an annular space 4 which is not divided, but its upper end is occupied by the internal tube 5 traversing the external tube 6, the device of the present invention consists of two systems of parallel deflectors which operate independently. This system is exactly equivalent to the case of an annular space divided into two sectors. As indicated in FIG. 2, it is preferable to alternate the two systems of deflectors in a manner such that the distance separating two consecutive deflectors (but not belonging to the same line because of this alternation) is in the range 25 cm to 75 cm.

Concerning the loading method using the device as described above, it can be described by the following steps:
- the loading system is initially wound into the external spooler 10, the feed hopper 1 being filled with solid;
- the loading system is then gradually introduced into the annular zone 4 via its upper portion until the first deflector 7 reaches a distance with respect to the bottom of the tube in the range 50 cm to 100 cm;
- the conveyor belt 2 is started up so as to provide a flow rate of solid in the range 250 to 500 kg/h;
- as and when the tube is filled, the loading system is raised from the annular zone 4 with the aid of the external spooler 10 in a manner such as to keep a constant distance between the first deflector and the surface of the bed which is gradually being constituted (the deflector at the lowest point when the device is vertically deployed is denoted the first deflector). This distance is in the range 50 cm to 100 cm. The system is therefore wound up at a speed equivalent to the speed of loading of the tube, in the range 0.2 m/min to 0.4 m/min;
- during loading, the feed hopper 1 can be refilled if its volume is less than that of the tube. This operation can be carried out with or without stopping the loading;
- once the tube has been loaded and the loading system wound up, the system is displaced in order to load the next tube.

Operations for checking loading with the aid of pressure drop measurements between two points of the bayonet tube accompany the loading operation, but are not described in this text as they are considered to be familiar to the skilled person.

EXAMPLE OF THE INVENTION

The example provided corresponds to a steam reforming exchanger-reactor for producing 100000 Nm$^3$/h of hydrogen.

This exchanger-reactor was provided with 300 bayonet tubes enclosed in a 10 m diameter shell.

Each bayonet tube was constituted by an external tube 6 with a diameter of 128.1 mm and an internal tube 5 with a diameter of 42 mm. Thus, the annular space 4 had a characteristic dimension of 43.05 mm. This annular space was divided into two identical radial sectors extending over the entire length of the tube, i.e. 14.5 m.

Each device comprised 10 deflectors separated by a vertical distance of 1 m for each of the two sectors.

A deflector was constituted by a vane substantially in the shape of a semi-circle with an exterior rim with a diameter of 140 mm and an interior rim with a diameter of 35 mm. The degree of occupation of the section of the sector was thus 85%.

The angle alpha of inclination of each deflector with respect to the vertical was 45°.

The loading obtained with such a system on a 12 m high tube was characterized by the following parameters:
density of bed: 960 kg/m$^3$
total loading time: 40 minutes (the two systems of deflectors for each sector operating in parallel)
variation in the pressure drop between tubes with respect to the mean of 5 successive loading operations: ±3%.

The invention claimed is:

1. A device for densely filling catalyst specially adapted to a steam reforming exchanger-reactor consisting of a plurality of bayonet tubes enclosed in a shell, the catalyst being constituted by particles occupying at least part of the annular space (4) included between an internal tube (5) and an external tube (6), the assembly of these two tubes constituting a bayonet tube, the width of said annular space being in the range 30 mm to 80 mm, and its height being in the range 10 to 20 meters, the catalyst particles being in the form of cylinders with an approximate height of 10 mm to 20 mm and an approximate diameter of 10 mm to 20 mm, said annular space (4) being divided into two or three substantially identical horizontal sectors, each sector extending the entire length of the bayonet tube, by means of a "centralizer" system disposed at the head of the annular space, each sector being equipped with its own system of deflectors, each system of deflectors consisting of:
   a series of deflectors (7) distributed in a regular vertical manner along the annular space (4) and separated by a vertical distance in the range 50 cm to 150 cm;
   said deflectors (7) being connected together via a chain (8) which winds around a spooler (10) located outside the tube to be filled, and the particles of catalyst being contained in:

a central feed hopper (1) for delivering the particles onto a conveyor belt or a shaker conveyor (2) supplying the annular space (4), via:
a funnel (3) via which the particles flow into the interior of the annular space (4).

2. A device for densely filling catalyst specially adapted to a stream reforming exchanger-reactor consisting of a plurality of bayonet tubes enclosed in a shell, the catalyst being constituted by particles occupying at least part of the annular space (4) included between an internal tube (5) and an external tube (6), the assembly of these two tubes constituting a bayonet tube, the width of said annular space being in the range 30 mm to 80 mm, and its height being in the range 10 to 20 meters, the catalyst particles being in the form of cylinders with an approximate height of 10 mm to 20 mm and an approximate diameter of 10 mm to 20 mm, said annular space (4) being divided into two or three substantially identical horizontal sectors, each sector extending the entire length of the bayonet tube, in which the upper portion of the annular space (4) is traversed by the internal tube (5) which traverses the external tube (6), which results in the use of two identical systems of deflectors (7) operating in parallel, in a manner equivalent to the case of an annular space divided into two sectors said deflectors (7) being connected together via a chain (8) which winds around a spooler (10) located outside the tube to be filled, and the particles of catalyst being contained in:
a central feed hopper (1) for delivering the particles onto a conveyor belt or a shaker conveyor (2) supplying the annular space (4), via:
a funnel (3) via which the particles flow into the interior of the annular space (4).

3. The filling device according to claim 1, in which each deflector (7) is in the form of a vane which is downwardly inclined at an angle alpha with respect to the vertical in the range 30° to 50°, each deflector occupying a portion of the horizontal surface area of the sector in the range 50% to 90% of said surface area of the sector.

4. The filling device according to claim 3 in which, when the diameter of the wall of the annular space (4) varies because portions of the external tube (6) have diameters which decrease from top to bottom, the system of deflectors (7) adapts itself to this variation in section, always satisfying the condition of occupation of said horizontal section in the range of 50% to 90% by adjusting the angle alpha, the smallest value being adapted to the portion with the smallest diameter and the largest value to the portion with the largest diameter, the articulation of the blade of the deflector about its axis being free, and a second set of chains (8') allowing the end of the blade of the deflector to be lifted to a greater or lesser extent order to vary the angle alpha.

5. The filling device according to claim 1 in which, when the diameter of the wall of the annular space (4) varies because portions of the external tube (6) have diameters which decrease from top to bottom, the system of deflectors (7) is provided, at its ends closest to the wall of the annular space (4), with lips (11) formed from rubber which can be used to adjust the length of the blades in order to conserve the coefficient of occupation of the section of the annular space in the case in which the internal diameter of the external tube of the bayonet is varied.

6. A method for loading catalyst using the device according to claim 1, characterized by the following series of steps:
initially winding the loading system into the external spooler (10), the feed hopper (1) being filled with solid;
the loading system is then gradually introduced into the annular zone (4) via its upper portion until the first deflector (7) reaches a distance with respect to the bottom of the tube in the range 50 cm to 100 cm;
the conveyor belt (2) is started up so as to provide a flow rate of solid in the range 250 to 500 kg/h, which solid is introduced into the annular zone (4) or a sector of said annular zone (4) via the funnel (3);
as and when the tube is filled, the loading system is raised from the annular zone (4) with the aid of the external spooler (10) in a manner such as to keep a constant distance between the first deflector (7) and the surface of the bed which is gradually being constituted, said distance being in the range 50 cm to 100 cm;
the system is wound up at a speed equivalent to the speed of loading of the tube, in the range 0.2 meter/min to 0.4 meter/min;
once the tube has been loaded and the loading system wound up, the system is displaced in order to load the next tube.

* * * * *